United States Patent
Kuo et al.

(10) Patent No.: US 9,665,738 B2
(45) Date of Patent: May 30, 2017

(54) ELECTRONIC DEVICES AND SIGNATURE WAKEUP METHODS THEREOF

(71) Applicant: MediaTek Inc., Hsin-Chu (TW)

(72) Inventors: Chung-Jen Kuo, Hsin-Chu (TW); Chih-Hsiang Hsiao, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/334,762

(22) Filed: Jul. 18, 2014

(65) Prior Publication Data

US 2016/0018914 A1 Jan. 21, 2016

(51) Int. Cl.
| | | |
|---|---|---|
| *G06F 3/041* | (2006.01) | |
| *G06F 21/82* | (2013.01) | |
| *G06F 1/32* | (2006.01) | |
| *G06F 21/55* | (2013.01) | |
| *G06F 21/74* | (2013.01) | |
| *H04M 1/67* | (2006.01) | |

(52) U.S. Cl.
CPC ............ *G06F 21/82* (2013.01); *G06F 1/3262* (2013.01); *G06F 21/554* (2013.01); *G06F 21/74* (2013.01); *H04M 1/67* (2013.01); *G06F 2221/2111* (2013.01); *H04M 2250/22* (2013.01)

(58) Field of Classification Search
CPC ..... G06F 1/3203; G06F 3/04883; G06F 21/82
See application file for complete search history.

(56) References Cited

U.S. PATENT DOCUMENTS

| | | | | |
|---|---|---|---|---|
| 2011/0012856 | A1* | 1/2011 | Maxwell et al. | 345/173 |
| 2012/0154303 | A1* | 6/2012 | Lazaridis et al. | 345/173 |
| 2012/0191993 | A1* | 7/2012 | Drader | G06F 1/3215 713/320 |
| 2013/0263254 | A1* | 10/2013 | Seo et al. | 726/19 |
| 2013/0265276 | A1* | 10/2013 | Obeidat | G06F 3/044 345/174 |
| 2014/0075226 | A1* | 3/2014 | Heo et al. | 713/323 |
| 2014/0317724 | A1* | 10/2014 | Hicks et al. | 726/19 |
| 2015/0062041 | A1* | 3/2015 | Kim et al. | 345/173 |
| 2015/0071505 | A1* | 3/2015 | Kim et al. | 382/119 |
| 2015/0149801 | A1* | 5/2015 | Vandermeijden et al. | 713/323 |
| 2015/0254471 | A1* | 9/2015 | You | G06F 21/6218 726/19 |

* cited by examiner

*Primary Examiner* — Lixi C Simpson
(74) *Attorney, Agent, or Firm* — McClure, Qualey & Rodack, LLP (57) ABSTRACT

An electronic device including a touch sensor and a processing unit is provided. The touch sensor is disposed on or under a display, and generates touch data for a touch detected thereon or therenear when the electronic device is locked with the display in a sleep state. The processing unit determines whether the touch data matches a predetermined signature according to the touch data, and wakes the display from the sleep state and unlocks the electronic device when the touch data matches the predetermined gesture.

16 Claims, 8 Drawing Sheets

ELECTRONIC DEVICES AND SIGNATURE WAKEUP METHODS THEREOF

BACKGROUND OF THE INVENTION

Field of the Invention

The invention generally relates to user interfaces that employ touch-sensitive technologies, and more particularly, to waking and unlocking an electronic device at the same time using a personal signature detected by a touch screen coupled to or in the electronic device.

Description of the Related Art

To an increasing extent, touch screens are being used as an alternative way for users to interact with electronic devices, such as touch books, mobile phones, panel PCs, media player devices, gaming devices, etc. In addition to providing a basic display function, a touch screen comprises one or more touch sensors for detecting the contact of objects thereon, thereby providing alternatives for user interaction therewith, for example, by using pointers, styluses, fingers, etc. In most practices, when the user does not interact with the electronic device for a certain period of time, the touch screen may enter a sleep state in which both the display function and the touch-detection function are shut down to save power. Later, the user may press a specific button on the electronic device to wake the touch screen from the sleep state for further use, such as phone dialing, texting, web browsing, etc. Although conventional designs provide convenient user operation, it lacks security. To improve the security of the conventional designs, the electronic device may be configured to be locked as long as the touch screen is in the sleep state. Later, when the touch screen is woken from the sleep state, the user may input a password to unlock the electronic device.

However, in the improved conventional designs, a user has to carry out two individual operations before the electronic device can be fully accessed, including a first operation to wake the touch screen, and a second operation to unlock the electronic device via the woken touch screen. As far as the user is concerned, the required user operations are somewhat complicated and time-consuming, not to mention that the security control using passwords lacks personal traits (i.e., anyone who knows that password may pass the security control). Thus, it is desirable to have a more efficient and individualized way for users to wake and unlock an electronic device.

BRIEF SUMMARY OF THE INVENTION

In one aspect of the invention, an electronic device is provided. The electronic device comprises a touch sensor and a processing unit. The touch sensor is disposed on or under a display, and generates touch data for a touch detected thereon when the electronic device is locked with the display in a sleep state. The processing unit determines whether the touch data matches a predetermined signature, and wakes the display from the sleep state and unlocks the electronic device when the touch data matches the predetermined gesture. In other words, the display remains off until signature matches, so handwriting will not be shown on the display. Advantageously, the invention improves security of the electronic device because it prevents someone from peaking your writing.

In another aspect of the invention, a signature wakeup method is provided for an electronic device comprising a display with a touch sensor disposed thereon or thereunder. The signature wakeup method comprises the steps of: generating touch data for a touch, which is detected on or near the display by the touch sensor, when the electronic device is locked with the display in a sleep state; determining whether the touch data matches a predetermined signature; and waking the display from the sleep state and unlocking the electronic device when the touch data matches the predetermined gesture.

In yet another aspect of the invention, a touch panel controller is provided. The touch panel controller comprises a plurality of processing logics. The first processing logic is operable to receive touch data for a touch detected on or near a touch panel of an electronic device when the electronic device is locked with the touch panel in a sleep state. The second processing logic is operable to determine whether the touch data matches a predetermined signature. The third processing logic is operable to wake the touch panel from the sleep state and unlock the electronic device when the touch data matches the predetermined signature.

Other aspects and features of the invention will become apparent to those with ordinary skill in the art upon review of the following descriptions of specific embodiments of the electronic devices, the signature wakeup methods, and the touch panel controllers.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
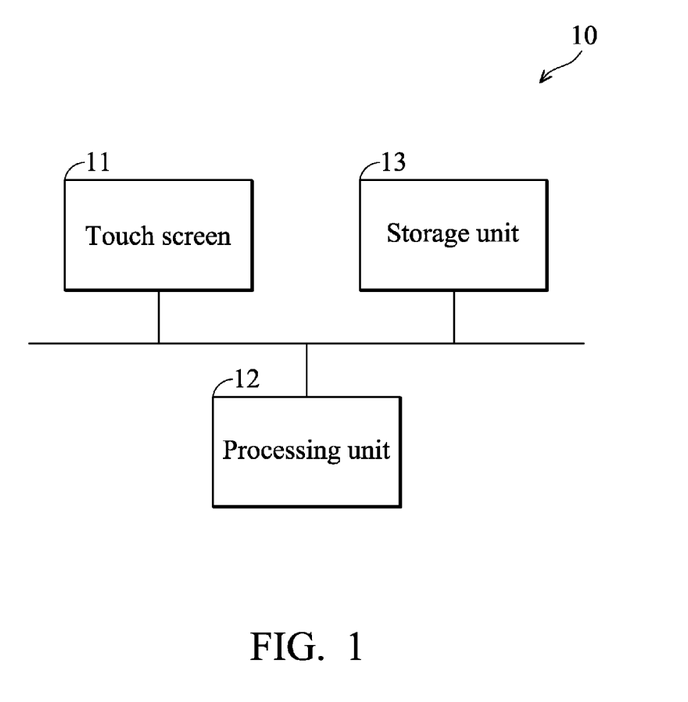
FIG. 1 is a block diagram of an electronic device according to an embodiment of the invention.

FIG. 1 is a block diagram of an electronic device according to an embodiment of the invention. The electronic device 10 may be a touch book, mobile/smart phone, panel PC, Portable Media Player (PMP), global positioning system (GPS) navigation device, gaming console, and so on. The electronic device 10 comprises a touch screen 11, a processing unit 12, and a storage unit 13. The touch screen 11 is sensitive to touches, contacts, or approximations of objects, such as fingers or styluses, and is capable of touch detection, including resistive type, capacitive type, or other types of touch detection. Specifically, the touch screen 11 may comprise a display (not shown), such as a Liquid-Crystal Display (LCD), Light-Emitting Diode (LED) display, Electronic Paper Display (EPD), etc., for providing display function, and one or more touch sensors (not shown) disposed on or under the display for providing touch-detection functionality. The processing unit 12 may be a general-purpose processor, a Micro-Control Unit (MCU), a Digital Signal Processor (DSP), or another, which comprises a plurality of processing logics for providing the function of data processing and computing. Also, the processing unit 12 controls the operation of the touch screen 11, and/or loads and executes a series of instructions and/or program codes from the storage unit 13 to perform the signature wakeup method of the invention for waking the touch screen 11 and unlocking the electronic device 10. For example, the processing unit 12 may be a Host Central Processing Unit (CPU), or a controller of a touch Integrated Circuit (IC) (also referred to as a touch panel controller), or a controller of a sensor hub which incorporates all sensing units including the touch sensors.

Although not shown, the electronic device 10 may further comprise other functional units, such as a power supply for providing portability of the electronic device 10, a Radio Frequency (RF) unit and a Baseband unit for wireless communication, and/or an Input/Output (I/O) device, e.g., button, keyboard, mouse, or touch pad, etc., and the invention is not limited thereto. In the situation where the electronic device 10 is a mobile/smart phone, the Baseband unit may contain multiple hardware devices to perform baseband signal processing, including Analog-to-Digital Conversion (ADC)/Digital-to-Analog Conversion (DAC), gain adjusting, modulation/demodulation, encoding/decoding, and so on, while the RF unit may receive RF wireless signals, convert the received RF wireless signals to baseband signals, which are processed by the Baseband unit, or receive baseband signals from the Baseband unit and convert the received baseband signals to RF wireless signals, which are later transmitted. The RF unit may also contain multiple hardware devices to perform radio frequency conversion, such as a mixer for multiplying the baseband signals with a carrier oscillated in the radio frequency of the wireless communications system, wherein the radio frequency may be 900 MHz, 1800 MHz or 1900 MHz utilized in Global System for Mobile communications (GSM), or 900 MHz, 1900 MHz or 2100 MHz utilized in Wideband Code Division Multiple Access (WCDMA) systems, or 900 MHz, 2100 MHz, or 2.6 GHz utilized in Long Term Evolution (LTE)/LTE-Advanced systems, or others depending on the Radio Access Technology (RAT) in use.

Figure 2:
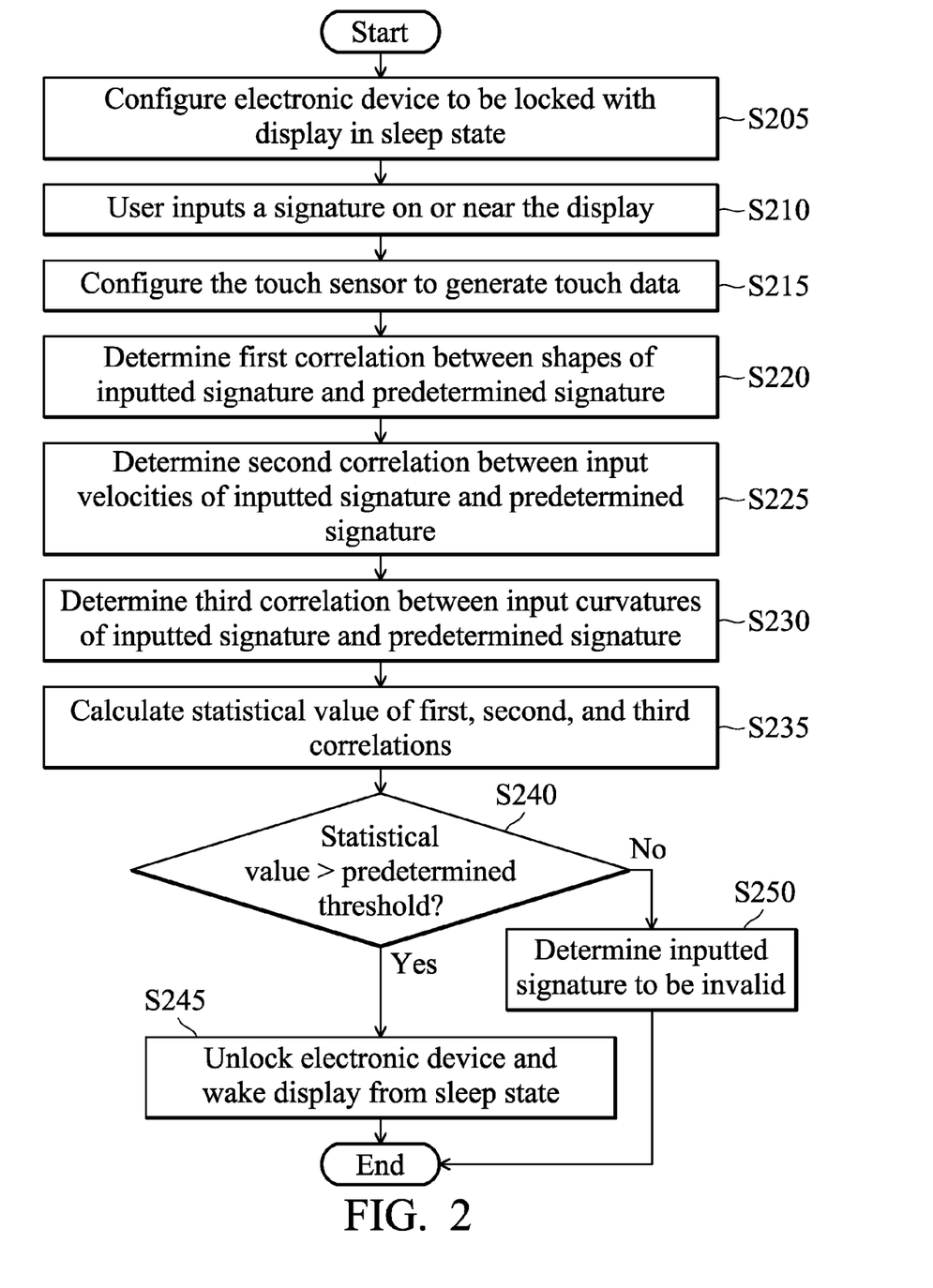
FIG. 2 is a flow chart illustrating the signature wakeup method according to an embodiment of the invention.

FIG. 2 is a flow chart illustrating the signature wakeup method according to an embodiment of the invention. In this embodiment, the signature wakeup method is applied to an electronic device comprising a display with a touch sensor disposed thereon or thereunder, a.k.a., a touch screen. To further clarity, the signature wakeup method may be specifically executed by a processing unit of the electronic device. To begin, the electronic device is configured to be locked with the display in a sleep state (step S205), wherein when the display is in the sleep mode, the display function is turned off and the touch-detection function of the touch sensor remains operative. Next, the user starts inputting a signature (conducting a continuous touch) on or near the display (step S210), and the electronic device configures the touch sensor to generate touch data for the continuous touch (step S215).

Specifically, the touch sensor is configured to use a first scan rate when the display is not touched, and to use a second scan rate that is higher than the first scan rate when the touch is detected. It is to be understood that, a lower power level is required to support the first scan rate, while a higher power level is required to support the second scan rate. Thus, with an adjustable scan rate, the power consumption of the electronic device is more efficient.

Figure 3A:
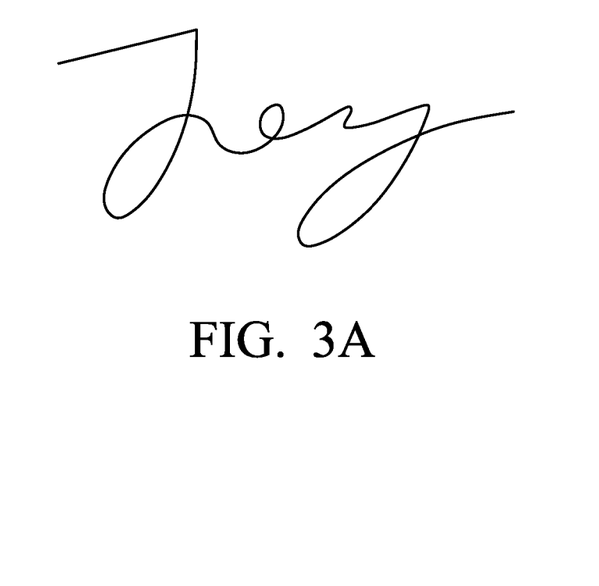
FIGS. 3A to 3C show schematic diagrams of exemplary signatures.
Figure 3B:
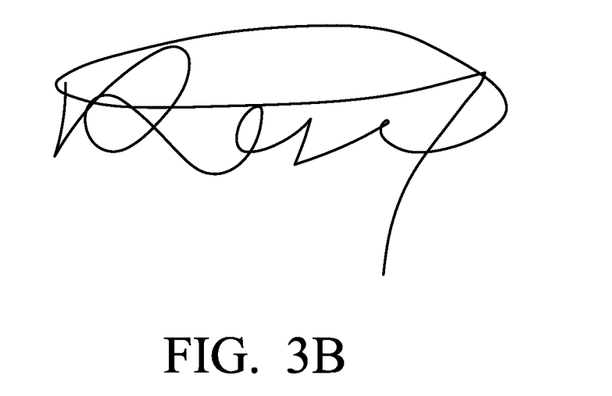
Figure 3C:
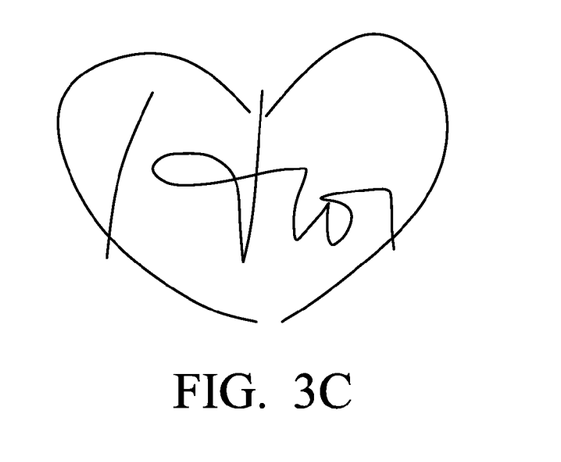

The input signature may include one or more numbers, characters, symbols, or patterns, or any combination thereof, as shown in FIGS. 3A-3C, which possesses personal traits of the user's writing/drawing.

Figure 4:
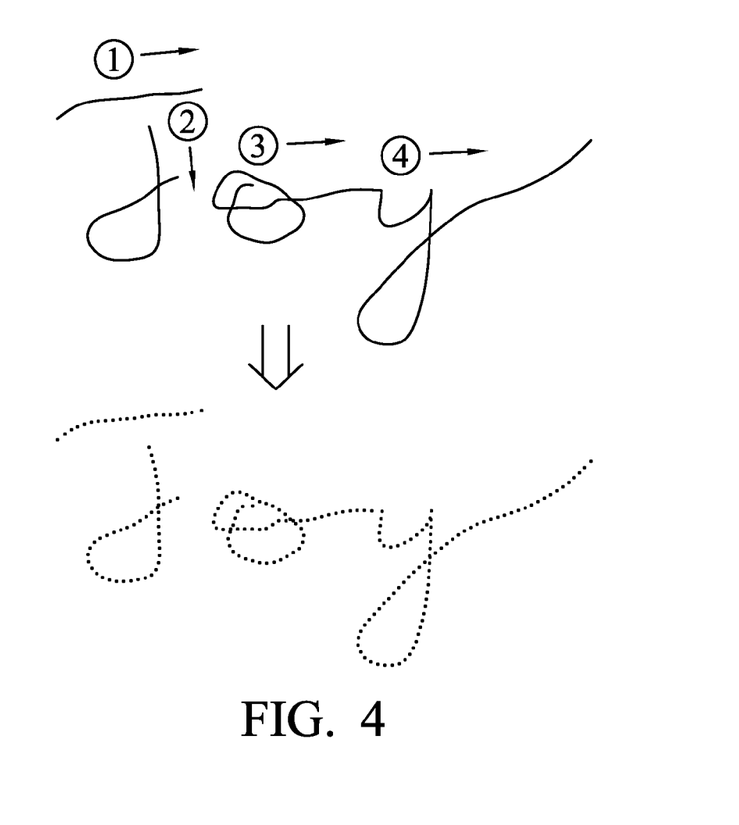
FIG. 4 is a schematic diagram illustrating a plurality of detected coordinates for an exemplary signature under a certain scan rate.

Due to the touch moving and continuing to be detected on or near the display via the touch sensor, the touch data may include information of a plurality of coordinates and times at which the touch is detected/updated, as shown in FIG. 4, wherein the depicted numbers 1 to 4 denote the writing order of the signature.

Subsequently, the electronic device determines whether the continuous touch corresponds to a predetermined signature according to the touch data (i.e., whether the touch data matches the predetermined signature), wherein the predetermined signature is preconfigured by the user as the key for security check and similarly, the predetermined signature may include one or more numbers, characters, symbols, or patterns, or any combination thereof. Specifically, the electronic device determines a first correlation between the shapes of the inputted signature and a predetermined signature (step S220), determines a second correlation between the input velocities of the inputted signature and the predetermined signature (step S225), and determines a third correlation between the input curvatures of the inputted signature and the predetermined signature (step S230).

The first correlation may refer to the similarity in shape between the inputted signature and the predetermined signature, and any known similarity measures and algorithms concerning shape matching may be applied. The detailed description of shape matching is omitted herein for brevity, since the shape matching manner is not limited in the invention.

Figure 5:
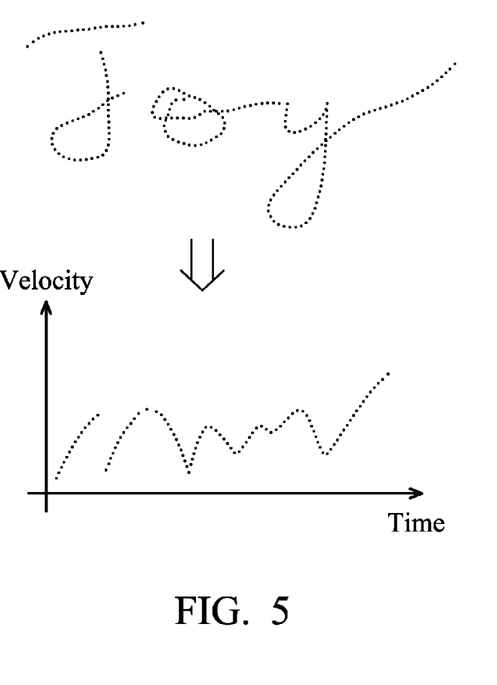
FIG. 5 is a schematic diagram showing the velocities and times corresponding to a plurality of touch detections for an exemplary signature.

The input velocity of the inputted signature or the predetermined signature may be obtained from the coordinates and times of the continuous touch. As shown in FIG. 5, an individual velocity value may be obtained by the distance between the coordinates of two successive touch detections of the continuous touch, and the time interval between the times at which the two successive touch detections of the continuous touch take place. The second correlation may refer to the similarity between the graphs of input velocities (e.g., FIG. 5) of the inputted signature and the predetermined signature.

Figure 6:
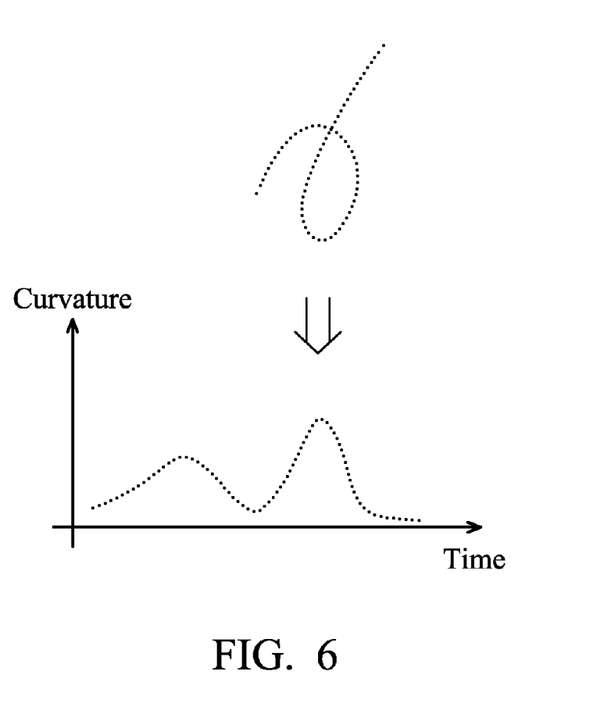
FIG. 6 is a schematic diagram showing the curvatures and times corresponding to a plurality of touch detections for an exemplary signature.

The input curvatures of the inputted signature or the predetermined signature may be obtained from the coordinates, times, and the velocity values of the continuous touch. As shown in FIG. 6, an individual curvature value may be obtained by applying the following equation (1):

$$\frac{\sqrt{(\dot{r}\cdot\dot{r})(\ddot{r}\cdot\ddot{r}) - (\dot{r}\cdot\ddot{r})^2}}{(\dot{r}\cdot\dot{r})^{3/2}}, \tag{1}$$

wherein $\dot{r}$ and $\ddot{r}$ respectively represent the velocity value and the acceleration value for two successive touch detections of the continuous touch. The third correlation may refer to the similarity between the graphs of input curvatures (e.g., FIG. 6) of the inputted signature and the predetermined signature.

After that, the electronic device calculates a statistical value of the first, second, and third correlations (step S235), and determines whether the statistical value is greater than a predetermined threshold (step S240). For example, the statistical value may be the weighted sum of the first, second, and third correlations, and may be obtained by applying the following equation (2):

$$(A \times 1st\_correlation) + (B \times 2nd\_correlation) + (C \times 3rd\_correlation) \qquad (2),$$

wherein A, B, and C are adjustable constants, and 1st_correlation, 2nd_correlation, and 3rd_correlation represent the first, second, and third correlations, respectively. In one embodiment, the input velocity may be a more accurate indicator as the personal trait of a user, so a larger B can be configured in equation (2).

In another embodiment for step S235, the electronic device may calculate a statistical value of any two of the first, second, and third correlations only. For example, the electronic device may calculate a statistical value of the first and second correlations, or of the first and third correlations, or of the second and third correlations. Alternatively, the electronic device may user only one of the first, second, and third correlations as the statistical value for the following steps.

Subsequent to step S240, if the statistical value is greater than a predetermined threshold, the inputted signature is considered valid, and the electronic device is unlocked and the display is woken from the sleep mode (step S245). Specifically, when the display is woken from the sleep mode, the display function is turned on. Otherwise, if the statistical value is less than or equal to the predetermined threshold, the inputted signature is considered as invalid, and the electronic device remains unlocked and the display stays in the sleep mode (step S250). The method ends after step S245 or S250.

In regard to the fact that the user may not input exactly the same signature every time, the setting of the statistical value and the predetermined threshold may tolerate a limited range of lapse for the user to input the signature, so that flexibility of user operation may be provided while keeping security of the electronic device.

Figure 7A:
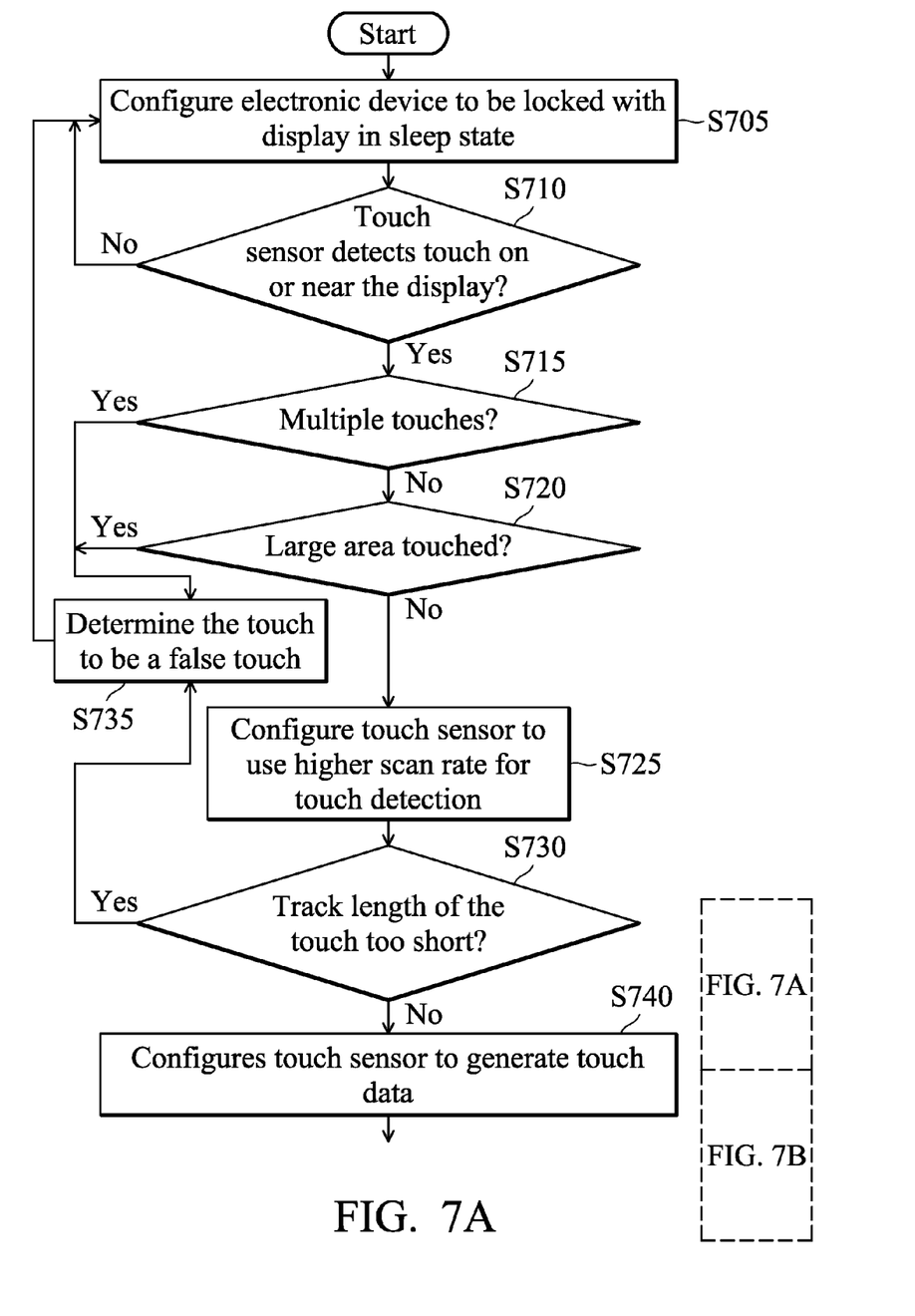
FIGS. 7A and 7B show a flow chart of the signature wakeup method according to another embodiment of the invention.
Figure 7B:
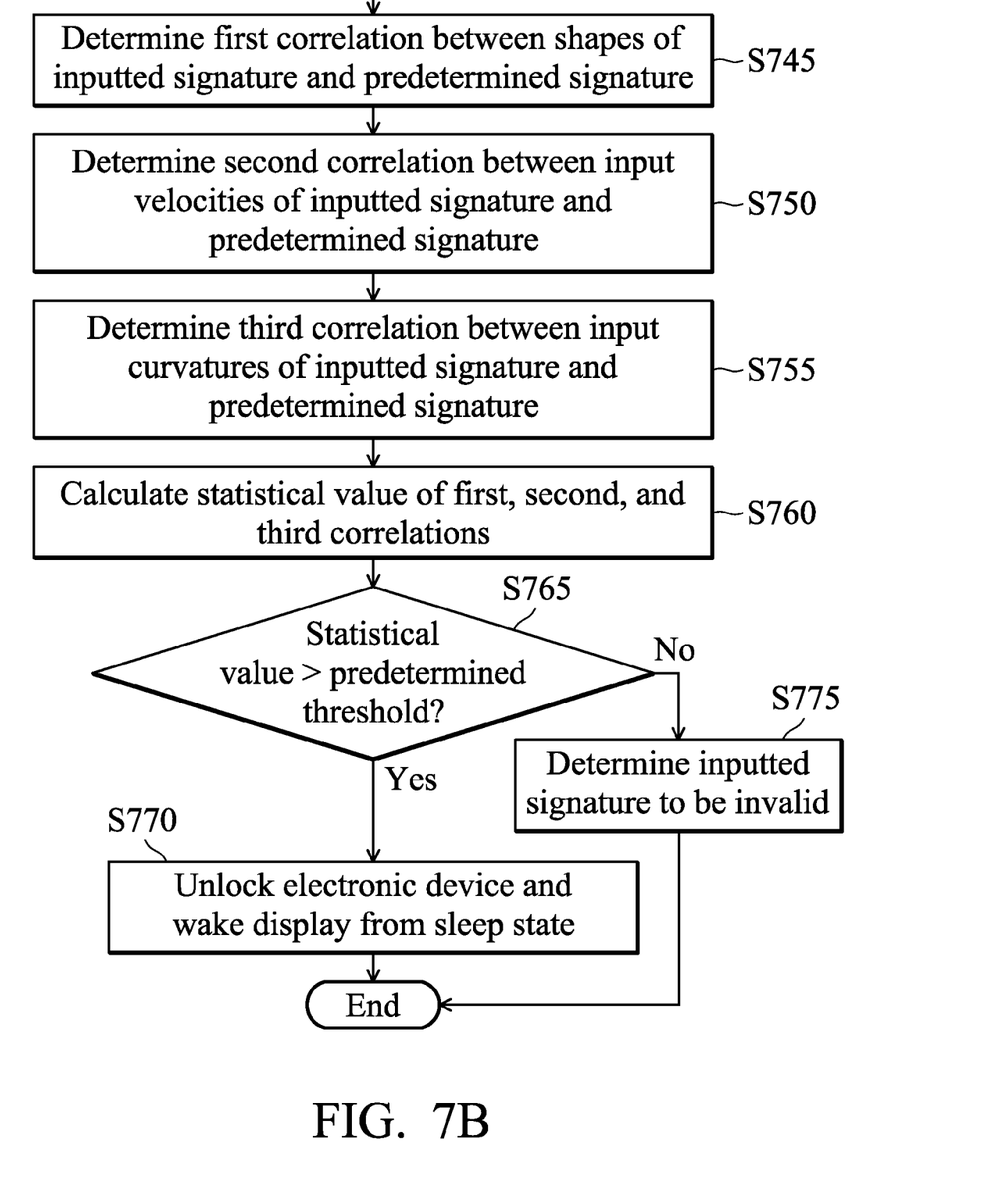

FIGS. 7A and 7B show a flow chart of the signature wakeup method according to another embodiment of the invention. Similar to the embodiment of FIG. 2, the signature wakeup method in this embodiment is applied to an electronic device comprising a display with a touch sensor disposed thereon or thereunder, and is specifically executed by a processing unit of the electronic device. To begin, the electronic device is configured to be locked with the display in a sleep state (step S705), wherein when the display is in the sleep mode, the display function is turned off and the touch-detection function of the touch sensor remains operative. Next, the touch sensor detects a touch on or near the display (step S710).

Subsequent to step S710, the electronic device may determine whether the touch is a false touch or not. Specifically, the electronic device determines whether the touch is detected in concurrence with another touch (step S715). That is, if multiple touches are detected at the same time, it may be determined to be a false touch.

Subsequent to step S715, if not, the electronic device further determines whether the area covered by the touch on the display is not within a predetermined range (step S720). That is, the predetermined range may indicate a range of the area generally covered by a fingertips, and if the touch covers an area larger than the predetermined range (e.g., an incidental touch of a palm on the display), it may be determined to be a false touch.

Subsequent to step S720, if not, the electronic device configures the touch sensor to use a higher scan rate for touch detection (step S725), and determines whether the track length of the touch on the display over a predetermined time period is less than a predetermined threshold (step S730). That is, if the track length of the touch in the predetermined time period is too short, it may be determined to be a false touch.

Subsequent to steps S715, S720, and S730, if so, the touch is determined to be a false touch (step S735), and the method goes back to step S705.

Subsequent to step S730, if not, the electronic device configures the touch sensor to generate touch data for the touch (step S740). It is to be understood that, the touch sensor may continuously generate touch data after the touch is first detected in step S710, but in step S740, the generated touch data is for the touch updated after step S730.

Subsequently, the electronic device may determine whether the touch corresponds to a predetermined signature according to the touch data (i.e., whether the touch data matches the predetermined signature), wherein the predetermined signature may include one or more numbers, characters, symbols, or patterns, or any combination thereof. Specifically, the electronic device determines a first correlation between the shapes of an inputted signature formed by the touch and the predetermined signature (step S745), determines a second correlation between the input velocities of the inputted signature and the predetermined signature (step S750), and determines a third correlation between the input curvatures of the inputted signature and the predetermined signature (step S755). The detailed description of the first, second, and third correlations are similar to the embodiment of FIG. 2, and thus, is omitted here for brevity.

After that, the electronic device calculates a statistical value of the first, second, and third correlations (step S760), and determines whether the statistical value is greater than a predetermined threshold (step S765). The statistical value is, for example, the weighted sum of the first, second, and third correlations.

Subsequent to step S765, if so, the inputted signature is considered as valid, and the electronic device is unlocked and the display is woken from the sleep mode (step S770). Otherwise, if the statistical value is less than or equal to the predetermined threshold, the inputted signature is considered as invalid, and the electronic device remains unlocked and the display stays in the sleep mode (step S775). The method ends after step S770 or S775.

In one embodiment, subsequent to steps S245 and S770, the electronic device may automatically launch an Application (APP) according to the inputted signature. Specifically, a plurality of predetermined signatures may be set, each of which corresponds to a respective APP. For example, if the inputted signature matches a first predetermined signature, an instant messenger APP may be automatically launched after waking the display from the sleep state and unlocking the electronic device; if the inputted signature matches a second predetermined signature, a web browsing APP may be automatically launched after waking the display from the sleep state and unlocking the electronic device; if the inputted signature matches a third predetermined signature, a phone dialing APP may be automatically launched after waking the display from the sleep state and unlocking the electronic device.

In one practice of steps S245 and S770, the touch panel controller of the electronic device may output an unlock signal to the host of the electronic device, and when receiving the unlock signal, the host accordingly unlocks the electronic device and wakes the display from the sleep mode. In another practice of steps S245 and S770, the touch panel controller of the electronic device may output a security password, instead of an unlock signal, to the host of the electronic device, and when receiving the security password, the host determines whether the security password is correct, and if so, unlocks the electronic device and wakes the display from the sleep mode.

It is noted that, in the aforementioned embodiments, the display remains in the sleep state until the user input matches the predetermined signature, so that the user input will not be shown by the display. Thus, the invention further keeps the confidentiality of the predetermined signature while saving power by holding the display in the sleep state as long as possible.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

Note that use of ordinal terms such as "first", "second", "third", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. An electronic device, comprising:
 a touch sensor, disposed on or under a display, generating touch data for a touch detected thereon when the electronic device is locked with the display in a sleep state, using a first scan rate when the display is not touched in the sleep state, and using a second scan rate higher than the first scan rate when the touch is detected in the sleep state; and
 a processing unit, determining whether the touch data matches one of a plurality of predetermined signatures, and waking the display from the sleep state and unlocking the electronic device when the touch data matches one of the predetermined signatures;
 wherein, when the electronic device is locked with the display in the sleep state, the processing unit further determines at least one of whether the touch is detected in concurrence with another touch and whether an area covered by the touch on the display is not within a predetermined range, configures the touch sensor to use the second scan rate when the touch is not detected in concurrence with another touch and the area covered by the touch is within the predetermined range, and configures the touch sensor to use the first scan rate when the touch is detected in concurrence with another touch or the area covered by the touch is not within the predetermined range.

2. The electronic device of claim 1, wherein the processing unit further determines a first correlation between shapes of a signature formed by the touch and the one of the predetermined signatures, a second correlation between input velocities of the signature and the one of the predetermined signatures, and a third correlation between input curvatures of the signature and the one of the predetermined signatures, and the touch data is determined to match the one of the predetermined signatures when a statistical value of the first correlation, the second correlation, and the third correlation is greater than a predetermined threshold.

3. The electronic device of claim 1, wherein the processing unit further determines whether a track length of the touch on the display over a predetermined time period is less than a predetermined threshold when the touch is not detected in concurrence with another touch and the area covered by the touch is within the predetermined range, and configures the touch sensor to use the first scan rate when the track length of the touch over the predetermined time period is less than the predetermined threshold.

4. The electronic device of claim 1, wherein each of the predetermined signatures corresponds to a respective Application (APP), and the processing unit further launches the APP corresponding to the one of the predetermined signatures when the touch data matches the one of the predetermined signatures.

5. The electronic device of claim 1, wherein the processing unit further determines a first correlation between shapes of a signature formed by the touch and the one of the predetermined signatures, and a second correlation between input velocities of the signature and the one of the predetermined signatures, and the touch data is determined to match the one of the predetermined signatures when a statistical value of the first correlation and the second correlation is greater than a predetermined threshold.

6. The electronic device of claim 1, wherein the processing unit further determines a first correlation between shapes of a signature formed by the touch and the one of the predetermined signatures, and a second correlation between input curvatures of the signature and the one of the predetermined signatures, and the touch data is determined to match the one of the predetermined signatures when a statistical value of the first correlation and the second correlation is greater than a predetermined threshold.

7. The electronic device of claim 1, wherein the processing unit further determines a first correlation between input velocities of the signature and the one of the predetermined signatures, and a second correlation between input curvatures of the signature and the one of the predetermined signatures, and the touch data is determined to match the one of the predetermined signatures when a statistical value of the first correlation and the second correlation is greater than a predetermined threshold.

8. A signature wakeup method for an electronic device comprising a display with a touch sensor disposed thereon or thereunder, the signature wakeup method comprising:
 configuring the touch sensor to use a first scan rate when the display is not touched in a sleep state;
 configuring the touch sensor to use a second scan rate higher than the first scan rate when a touch is detected on the display in the sleep state by the touch sensor;
 when the electronic device is locked with the display in the sleep state, determining at least one of: whether the touch is detected in concurrence with another touch and whether an area covered by the touch on the display is not within a predetermined range;

configuring the touch sensor to use the second scan rate when the touch is not detected in concurrence with another touch and the area covered by the touch is within the predetermined range;

configuring the touch sensor to use the first scan rate when the touch is detected in concurrence with another touch or the area covered by the touch is not within the predetermined range;

generating touch data for the touch when the electronic device is locked with the display in the sleep state;

determining whether the touch data matches one of a plurality of predetermined signatures; and waking the display from the sleep state and unlocking the electronic device when the touch data matches one of the predetermined signatures.

9. The signature wakeup method of claim 8, further comprising:

determining a first correlation between shapes of a signature formed by the touch and the one of the predetermined signatures, a second correlation between input velocities of the signature and the one of the predetermined signatures, and a third correlation between input curvatures of the signature and the one of the predetermined signatures, wherein the touch data is determined to match the one of the predetermined signatures when a statistical value of the first correlation, the second correlation, and the third correlation is greater than a predetermined threshold.

10. The signature wakeup method of claim 8, further comprising:

determining whether a track length of the touch on the display over a predetermined time period is less than a predetermined threshold when the touch is not detected in concurrence with another touch and the area covered by the touch is within the predetermined range; and configuring the touch sensor to use the first scan rate when the track length of the touch over the predetermined time period is less than the predetermined threshold.

11. The signature wakeup method of claim 8, wherein each of the predetermined signatures corresponds to a respective Application (APP), and the signature wakeup method further comprises:

launching the APP corresponding to the one of the predetermined signatures when the touch data matches the one of the predetermined signatures.

12. The signature wakeup method of claim 8, further comprising:

determining a first correlation between shapes of a signature formed by the touch and the one of the predetermined signatures, and a second correlation between input velocities of the signature and the one of the predetermined signatures, wherein the touch data is determined to match the one of the predetermined signatures when a statistical value of the first correlation and the second correlation is greater than a predetermined threshold.

13. The signature wakeup method of claim 8, further comprising:

determining a first correlation between shapes of a signature formed by the touch and the one of the predetermined signatures, and a second correlation between input curvatures of the signature and the one of the predetermined signatures, wherein the touch data is determined to match the one of the predetermined signatures when a statistical value of the first correlation and the second correlation is greater than a predetermined threshold.

14. The signature wakeup method of claim 8, further comprising:

determining a first correlation between input velocities of the signature and the one of the predetermined signatures, and a second correlation between input curvatures of the signature and the one of the predetermined signatures, wherein the touch data is determined to match the one of the predetermined signatures when a statistical value of the first correlation and the second correlation is greater than a predetermined threshold.

15. A touch panel controller, comprising:

a first processing logic, operable to receive touch data for a touch detected on a touch panel of an electronic device when the electronic device is locked with the touch panel in a sleep state, wherein the touch data is generated by a touch sensor using a first scan rate higher than a second scan rate which is used when the touch panel is not touched in the sleep state;

a second processing logic, operable to determine at least one of whether the touch is detected in concurrence with another touch and whether an area covered by the touch on the display is not within a predetermined range, when the electronic device is locked with the display in the sleep state;

a third processing logic, operable to configure the touch sensor to use the first scan rate when the touch is not detected in concurrence with another touch and the area covered by the touch is within the predetermined range;

a fourth processing logic, operable to configure the touch sensor to use the second scan rate when the touch is detected in concurrence with another touch or the area covered by the touch is not within the predetermined range;

a fifth processing logic, operable to determine whether the touch data matches one of a plurality of predetermined signatures; and a sixth processing logic, operable to wake the touch panel from the sleep state and unlock the electronic device when the touch data matches one of the predetermined signatures.

16. The touch panel controller of claim 15, wherein each of the predetermined signatures corresponds to a respective Application (APP), and the touch panel controller further comprises a seventh processing logic operable to launch the APP corresponding to the one of the predetermined signatures when the touch data matches the one of the predetermined signatures.

* * * * *